(12) United States Patent
Tsuji

(10) Patent No.: US 9,524,423 B2
(45) Date of Patent: Dec. 20, 2016

(54) IMAGE RECOGNITION APPARATUS, CONTROL METHOD, AND PROGRAM OF THE SAME

(71) Applicant: CANON KABUSHIKI KAISHA, Tokyo (JP)

(72) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 14/141,017

(22) Filed: Dec. 26, 2013

(65) Prior Publication Data

US 2014/0184812 A1    Jul. 3, 2014

(30) Foreign Application Priority Data

Dec. 27, 2012 (JP) ................. 2012-286018

(51) Int. Cl.
  *H04N 5/225*  (2006.01)
  *G06K 9/00*  (2006.01)
  *H04N 5/232*  (2006.01)

(52) U.S. Cl.
  CPC ....... *G06K 9/00295* (2013.01); *G06K 9/00288* (2013.01); *H04N 5/23219* (2013.01)

(58) Field of Classification Search
  None
  See application file for complete search history.

(56) References Cited

U.S. PATENT DOCUMENTS

| 2009/0324020 A1* | 12/2009 | Hasebe | G06K 9/00228 |
| | | | 382/115 |
| 2011/0194732 A1* | 8/2011 | Tsuji | G06K 9/00288 |
| | | | 382/103 |

FOREIGN PATENT DOCUMENTS

| JP | 2002-251380 A | 9/2002 |
| JP | 2003-187352 A | 7/2003 |

\* cited by examiner

*Primary Examiner* — Sath V Perungavoor
*Assistant Examiner* — Dakshesh Parikh
(74) *Attorney, Agent, or Firm* — Cowan, Liebowitz & Latman, P.C.

(57) ABSTRACT

An image recognition apparatus is arranged to extract feature information of an object area detected from among images, compare with feature information of previously-registered objects, thereby calculating a degree of similarity, when the calculated degree of similarity is equal to or greater than a predetermined threshold value, determine the object included in the object area as a registered object and set a recognition confirmed state that is successively maintained between images, and when a reliability of the object tracking is low and the degree of similarity is smaller than the predetermined threshold value, set the recognition confirmed state which is successively maintained into a recognition unconfirmed state where the object included in the object area is not determined as a registered object.

8 Claims, 6 Drawing Sheets

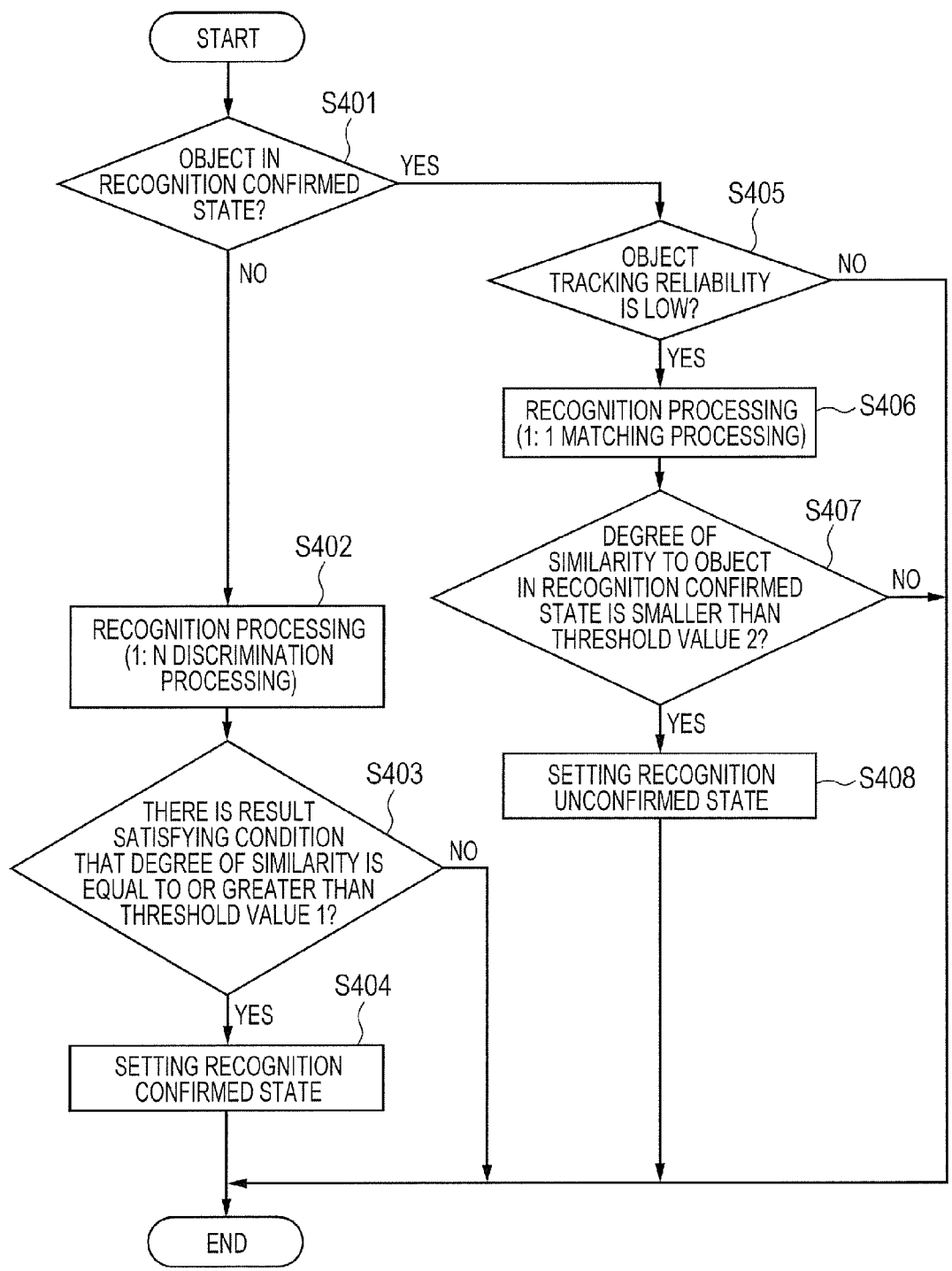

IMAGE RECOGNITION APPARATUS, CONTROL METHOD, AND PROGRAM OF THE SAME

BACKGROUND OF THE INVENTION

Field of the Invention

The present invention relates to an image recognition apparatus for recognizing an object included in an image, and its control method and program.

Description of the Related Art

In recent years, an image pickup apparatus having an object recognition function for recognizing a specific object included in an image is proposed. With the object recognition function, a focus and an exposure can be preferentially controlled for the recognized object. The image pickup apparatus having the object recognition function detects an object area including the object from an image obtained by a photographing and extracts feature information for discriminating the object area as a recognition target from the image of the detected object area. The extracted feature information is compared with feature information of registered objects which have previously been registered as dictionary data and, on the basis of a degree of similarity obtained by the comparison, which registered object the object of a recognition target is or whether or not the relevant registered object exists is recognized. Such a system that a person's face is detected as an object area, feature information of the detected face is extracted, and whose face is the detected face is determined, thereby performing a personal recognition is disclosed (for example, refer to the Official Gazette 1 of Japanese Patent Application Laid-Open No. 2003-187352). In the Description, with respect to an image such as a detected face or the like, a processing for discriminating whose (which) face such an image corresponds is referred to as "recognition".

For example, in the case of detecting a face as an object area, an accuracy of such an object recognition as mentioned above is influenced by a state such as an expression or orientation of the face area. Therefore, if a state of the face area of the recognition target differs from a state of the face area registered as dictionary data, there is a case where an accuracy of the personal recognition deteriorates. Therefore, there is a case where a result of the accurate personal recognition cannot be expected depending on the state of the face area of the recognition target. In a case where the image pickup apparatus has an image pickup unit which supplies images picked up sequentially in time series, if a state where which registered object the recognition target is confirmed is successively maintained between images by using an object tracking technique, a recognition confirmed state can be stably maintained. However, if a failure in tracking occurs in the object tracking, the recognition confirmed state is successively maintained to a different object, so that the apparatus will be in a state where such a different object is recognized as a registered object.

SUMMARY OF THE INVENTION

The invention is made in consideration of the foregoing problems and it is an aspect of the invention that a recognition confirmed state of a photographed object is successively maintained between images by means of an object tracking, thereby stabilizing the recognition confirmed state and preventing such a situation that the recognition confirmed state is successively maintained to a different object.

According to an aspect of the invention, an image recognition apparatus for recognizing a specific object from among images supplied in time series, comprises: a storage unit configured to store feature information regarding the specific object; an object detection unit configured to detect an object area from the supplied image; an object recognition unit configured to extract feature information from the image of the object area detected by the object detection unit, compare the extracted feature information with the feature information of the specific object stored in the storage unit, thereby calculating a degree of similarity, and perform an object recognition on the basis of the calculated degree of similarity; an object tracking unit configured to track the object included in the object area detected by the object detection unit, in the images supplied, in time series; and a reliability determination unit configured to determine a reliability of the object tracking which is performed by the object recognition unit, wherein when the degree of similarity calculated by the object recognition unit is equal to or greater than a predetermined threshold value, the object included in the object area is determined as being the specific object stored in the storage unit so that a recognition confirmed state is set, the recognition confirmed state is successively maintained between the images supplied in time series by means of the object tracking which is performed by the object recognition unit, and when a reliability of the object tracking is low and the degree of similarity calculated by the object recognition unit is smaller than the predetermined threshold value, the recognition confirmed state which is successively maintained is set to a recognition unconfirmed state where the object included in the object area is not determined as being the specific object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating a processing of the object recognition in the embodiment.

DESCRIPTION OF THE EMBODIMENTS

Various exemplary embodiments, features, and aspects of the present invention will be described in detail below with reference to the drawings.

Figure 1:
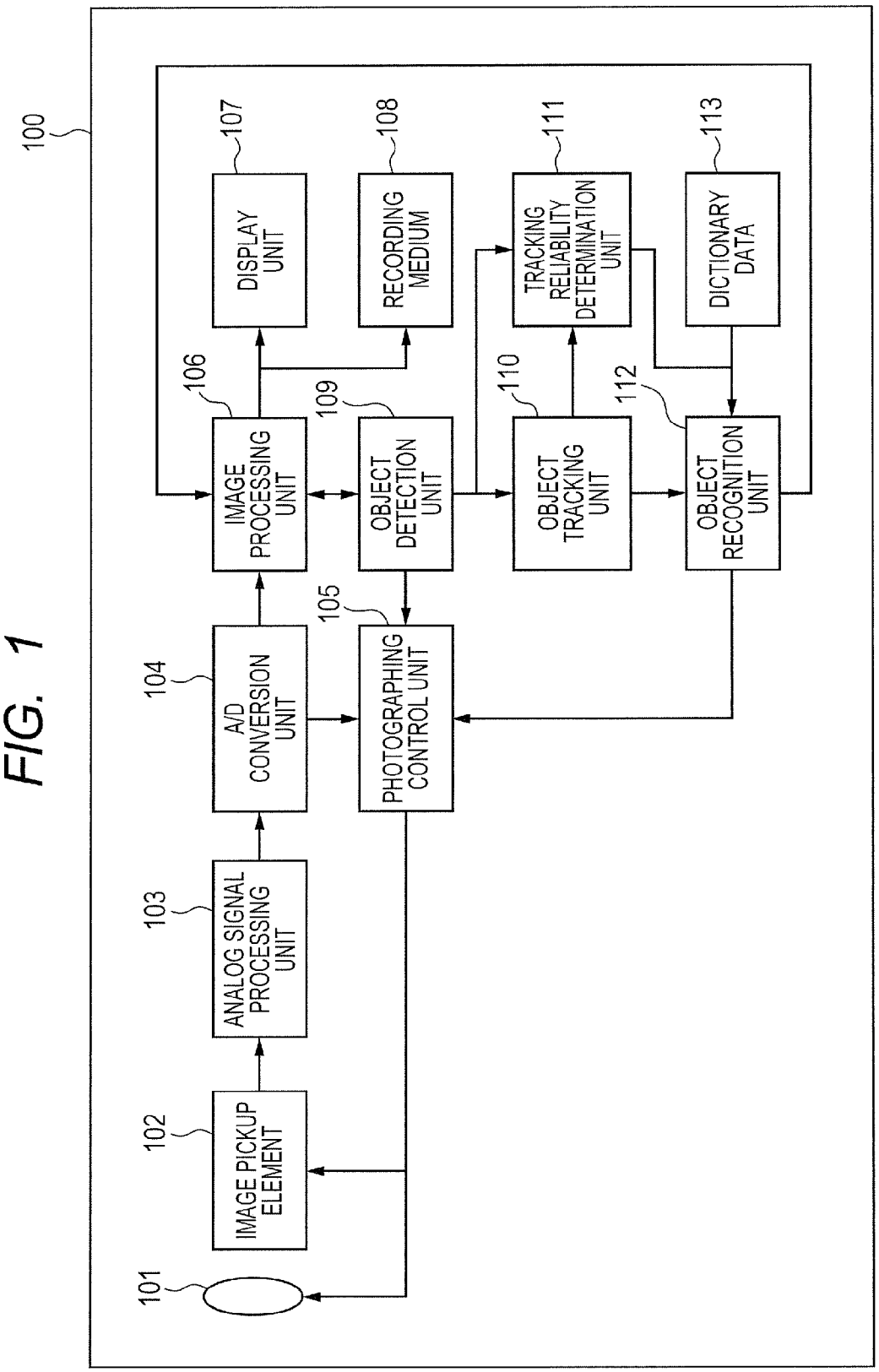
FIG. 1 is a diagram illustrating an example of a construction of an image pickup apparatus according to an embodiment of the invention.

FIG. 1 is a block diagram illustrating an example of a schematic construction of an image pickup apparatus 100 having an image recognition apparatus according to an embodiment of the invention. The image pickup apparatus 100 has a function for detecting an area including a specific part as an object area from an image obtained by being photographed, extracting feature information of the image of the detected object area, and recognizing an object on the basis of the feature information. In the embodiment, the image pickup apparatus 100 having the function for detecting a person's face as an object area from an image obtained by being photographed, extracting feature information of the detected face, and performing a personal recognition for discriminating whose face the face detected is will be described as an example.

In the image pickup apparatus 100, light forming an object image is converged by an image pickup optical system 101 including a photographing lens and enters an image pickup element 102. The image pickup element 102 is, for example, a CCD (Charge Coupled Device) image sensor or a CMOS (Complementary Metal Oxide Semiconductor) image sensor. The image pickup element 102 has a plurality of pixels each having a photoelectric conversion element and outputs an electric signal corresponding to the incident light on a pixel basis. That is, the electric signal which is output from the image pickup element 102 is a signal obtained by photoelectrically converting the incident light forming the object image by the image pickup element 102 and is an analog image signal showing an image including the object image picked up by the image pickup element 102.

An analog signal, processing unit 103 performs an analog signal processing such as a CDS (Correlated Double Sampling) or the like to the image signal which is output from the image pickup element 102. An A/D (analog/digital) conversion unit 104 converts the analog image signal, which is output from the analog signal processing unit 103 into a format of digital data. The image signal of the digital format converted by the A/D conversion unit 104 is input to a photographing control unit 105 and an image processing unit 106.

The image processing unit 106 executes an image processing such as gamma correction, white balance processing, or the like to the image signal of the digital format which is input. The image processing unit 106 has a function for executing an image processing using information regarding the specific object area in the image which is supplied from an object detection unit 109 or an object recognition unit 112, which will, be described hereinafter, in addition to an ordinary image processing.

A display unit 107 is, for example, an LCD (Liquid Crystal Display) or an EL (electroluminescence) display and displays an image on the basis of the image signal which is supplied from the image processing unit 106. The image pickup apparatus 100 allows images picked up sequentially in time series by the image pickup element 102 to be displayed to the display unit 107, thereby enabling the display unit 107 to function as an EVF (electronic viewfinder). The image signal which is output from the image processing unit 106 can be recorded to a recording medium 108. The recording medium 108 is, for example, a memory card which is detachable to the image pickup apparatus 100. A recording medium on which an image signal is recorded may be a memory built in the image pickup apparatus 100 or an external apparatus connected to the image pickup apparatus 100 so that it can communicate therewith.

The object detection unit 109 receives the image signal from the image processing unit 106, detects a target object in the image, and specifies the number of objects and an object area. As mentioned above, the target object in the present embodiment is a person's face and, as a face detecting method, it is sufficient to use a well-known face detecting method. In related arts regarding the face detection, for example, there are a method whereby knowledge (flesh color information, parts such as eyes, nose, mouse, and the like) regarding the face is used, a method whereby a discriminator for face detection is constructed by a learning algorithm represented by a neural network, and the like. In the face detection, in order to improve a detection accuracy, generally, a plurality of face detecting methods are combined to perform the face detection. For example, as disclosed the Official Gazette of Japanese Patent Application Laid-Open No. 2002-251380, a method of detecting a face by using a wavelet transformation and an image feature amount or the like can be mentioned. As detection data which is output by the object detection unit 109, for example, there a position, a size, and an inclination of each detected objects, a reliability of a detection result, and the like. In the face detection in the object detection unit 109, in the case of performing the detection by using a plurality of discriminators corresponding to face orientations such as front face, face in profile, and the like, the face orientation can be output as detection data by discriminating the discriminator which is used for the detection.

In an image such as a moving image including a plurality of frames, a detection processing of a target object is executes by the object detection unit 109 every frame of a predetermined period. An object tracking unit 110 discriminates whether or not the object area detected in a certain frame and which one of the object areas detected in different frames are the areas of the same object, thereby tracking the object included in the image. For example, in the objects detected from each image data of the frames which are sequentially supplied in time series, the object tracking unit 110 regards that the objects whose sizes and positions are similar are the same object. By tracking the object by the object tracking unit 110, the image pickup apparatus 100 can successively maintain a result of the object recognition unit 112, which will be described hereinafter, in the time base direction between images (between frames).

A tracking reliability determination unit 111 determines a reliability of the object tracking which is performed by the object tracking unit 110. As mentioned above, the object tracking unit 110 tracks the object on the basis of the similarities of the sizes and positions of the objects detected from respective image data of the frames which are sequentially supplied in time series. In the present embodiment using such a tracking method, if a plurality of object areas detected by the object detection unit 109 are densely distributed, the tracking reliability determination unit 111 determines that the reliability of the object tracking by the object tracking unit 110 is low. If a plurality of object areas detected by the object detection unit 109 are distantly distributed, the tracking reliability determination unit 111 determines that the reliability of the object tracking the object tracking unit 110 is high. If the object tracking method by the object tracking unit 110 is a method based on a pattern matching of the images such as a template matching or the like, it is sufficient that the tracking reliability determination unit 111 determines the reliability of the object tracking by a sum of differences serving as an evaluation value of the tracking or a value of a normalized correlation.

The object recognition unit 112 executes an object recognition processing for discriminating whether or not the object included in the object area detected by the object detection unit 109 is a specific object. From the images (object images) of the object area detected by the object detection unit 109, the object recognition unit 112 extracts feature information for discriminating the object area as a recognition target. The object recognition unit 112 compares the extracted feature information with feature information of the images of the objects (registered objects) which is previously registered as dictionary data in a storage unit 113 and calculates a degree of similarity. On the basis of the degree of similarity obtained comparing the feature information, the object recognition unit 112 recognizes which one of the registered objects the recognition target object is or whether or not the relevant registered object does not exist.

Figure 2:
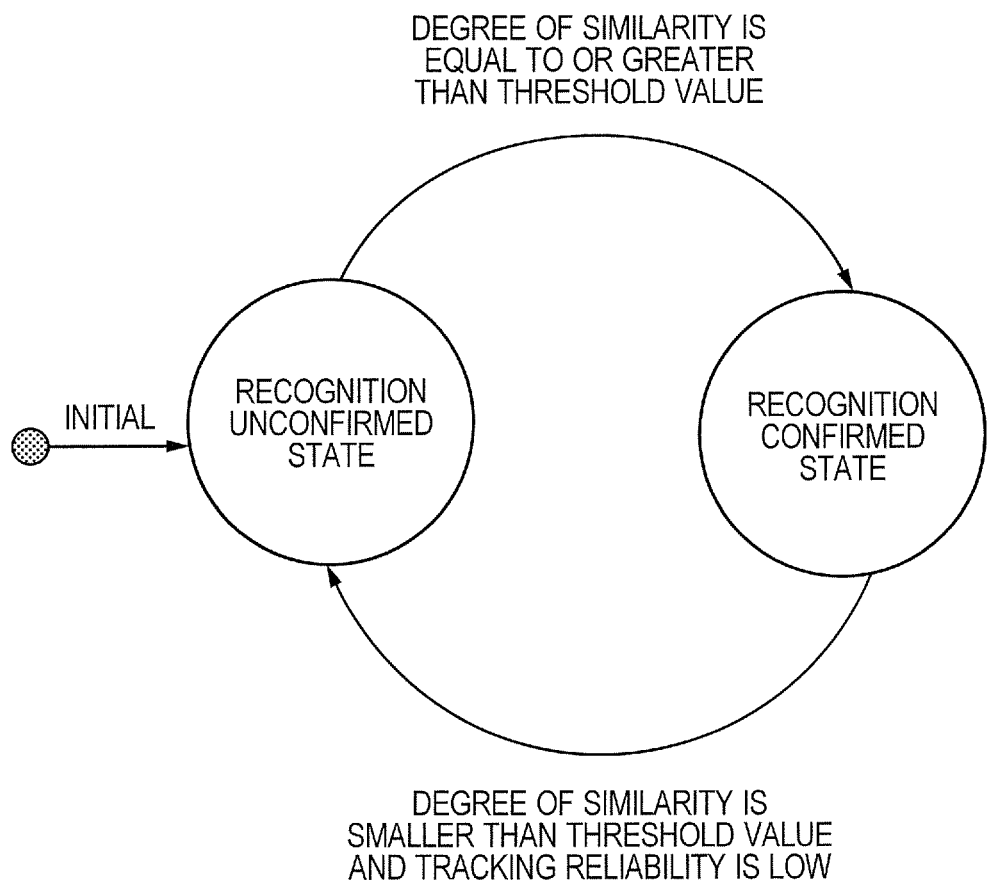
FIG. 2 is a diagram illustrating a state transition of an object recognition in the embodiment.

For example, the object recognition unit 112 provides a predetermined threshold value is provided for the degree of similarity and, if the calculated degree of similarity is equal to or greater than the predetermined threshold value, determines that the recognition target object is the registered object registered in the dictionary data. A state where it is determined that the recognition target object is registered object registered in the dictionary data is assumed to be a "recognition confirmed state". A state where it is determined that the recognition target object is none of the registered objects is assumed to be a "recognition unconfirmed state". In the image pickup apparatus 100, the recognition confirmed state is successively maintained in the time base direction by the object tracking by the object tracking unit 110. In the object in which the recognition confirmed state is successively maintained by the object tracking unit 110, if the degree of similarity by the object recognition unit 112 is smaller than the predetermined threshold value and if it is determined by the tracking reliability determination unit 111 that the reliability is low, the recognition confirmed state is set to the recognition unconfirmed state. FIG. 2 illustrates a state transition of the object recognition in the embodiment.

As dictionary data, the feature information of the specific object (registered object) is registered in relation to the relevant object (registered object) in the storage unit 113, for example, the feature information is a feature amount of the image of the specific object (registered object) or the image for object recognition. A plurality of objects may be registered as dictionary data in the storage unit 113. It is also possible to construct in such a manner that a plurality of data of the same object can be registered as dictionary data in the storage unit 113.

The photographing control unit 105 controls a focus control mechanism (not shown) and an exposure control mechanism (not shown) of the image pickup optical system 101 on the basis of the image signal which is output from the A/D conversion unit 104. The photographing control unit 105 can use the information which is supplied from the object detection unit 109 or the object recognition unit 112 and shows an extraction result of the target object area in the control of the focus control mechanism and the exposure control mechanism. Therefore, the image pickup apparatus 100 has a function for executing the photographing processing under image pickup conditions in consideration of the information of the specific object area in the picked-up image. The photographing control unit 105 also controls output timing, an output pixel, and the like of the image pickup element 102. In the construction illustrated in FIG. 1, for example, the function as an image recognition apparatus according to the embodiment is realized by the image processing unit 106, object detection 109, object tracking unit 110, tracking reliability determination unit 111, object recognition unit 112, and storage unit 113.

Figure 3:
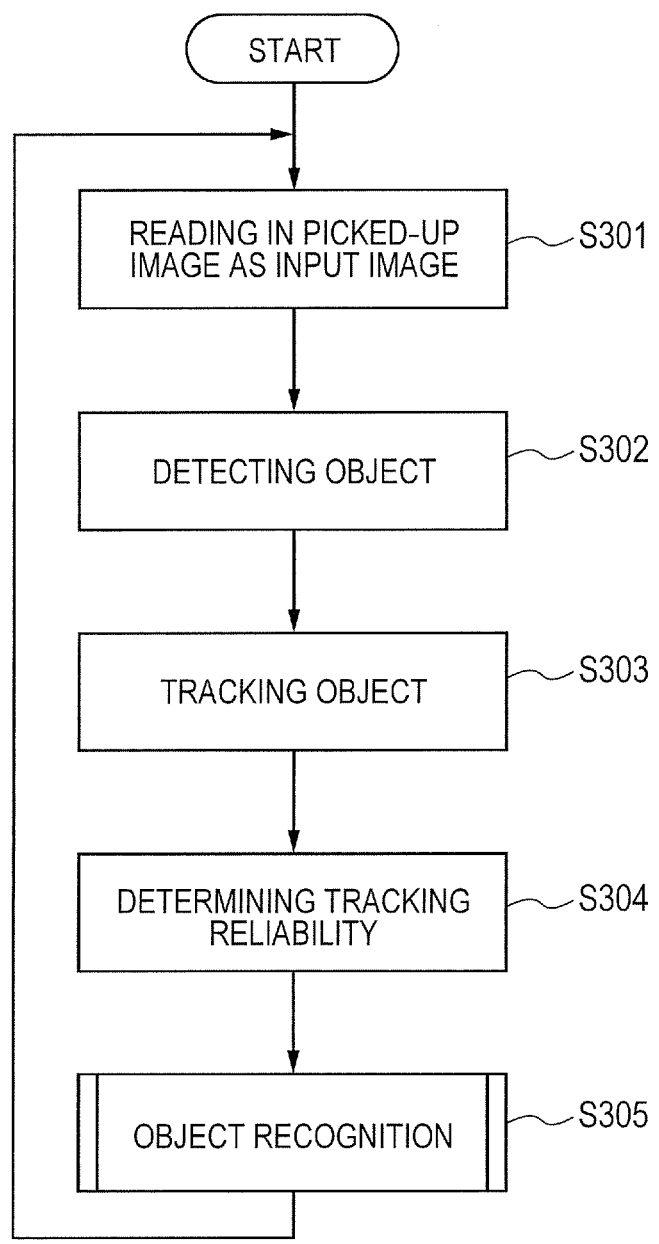
FIG. 3 is a flowchart illustrating an example of a processing of the image pickup apparatus according to the embodiment.

A flow for a processing mainly for the object recognition in the image pickup apparatus 100 according to present embodiment will be described with reference to FIG. 3. The image processing unit 106 reads the image obtained by converting the picked-up image obtained through the image pickup element 102 into the digital data by the A/D conversion unit 104 as an input, image (S301). Subsequently, the object detection unit 109 detects the object area from the input image and outputs detection data (S302). As detection data by the object detection unit 109, the number of detection results, a position, a size, and an orientation in the image of each detection result, a reliability of the detection result, and the like are obtained.

With respect to each of the object areas detected by the object detection unit 109, the object tracking unit 110 discriminates the same object between the frames which are sequentially supplied in time series (S303). For example, with respect to each object area detected by the object detection unit 109, if the degrees of similarity of the positions and sizes of the object areas obtained as detection data between the frames which are sequentially supplied in time series satisfy a predetermined reference, the object tracking unit 110 determines that the relevant objects are the same object. If the object area in which the degrees of similarity of the positions and sizes of the object areas obtained as detection data between the frames which are sequentially supplied in time series satisfy the predetermined reference does not exist, it is regarded that the relevant objects are the objects which appears newly. By such a processing of the object tracking unit 110, the state in the past frame can be successively maintained in each object.

Subsequently, the tracking reliability determination unit 111 determines the reliability of the tracking to each object (S304). In the present embodiment, since the object tracking method is based on the similarity of the detection data between the frames, if the object areas are densely distributed, a possibility to erroneously determine that different objects are the same object is high. On the contrary, if the object areas are distantly distributed, a possibility to erroneously determine that different objects are the same object is low. Therefore, in a case where when the detected object areas are densely distributed, the tracking reliability determination unit 111 determines that the reliability is low, and in a case where the detected object areas are distantly distributed, the tracking reliability determination unit 111 determines that the reliability is high.

Subsequently, the object recognition unit 112 recognizes whether or not the object included in the object area detected by the object detection unit 109 is the object (registered object) registered in the storage unit 113 as dictionary data 113 (S305). The object recognition processing in step S305 will be described in detail hereinafter. The image pickup apparatus 100 executes the processings in steps from S301 to S305 to each of the picked-up images which are sequentially supplied in time series. In this manner, according to the image pickup apparatus 100, the recognition result which is confirmed in the past with respect to the recognition target object is successively maintained between the images by the object tracking, thereby enabling the stability of the recognition result to be improved.

A flow for the object recognition processing by the object recognition unit 112 in step S305 shown in FIG. 3 will be described with reference to FIG. 4. The object recognition processing shown in FIG. 4 is executed to each object. First, the object recognition unit 112 discriminates whether or not the object included in the processing target object area is in the recognition confirmed state (S401). If it is not in the recognition confirmed state as a result of the discrimination (NO in S401), the object recognition unit 112 executes the recognition processing (S402). "recognition processing" mentioned here denotes a processing for extracting feature data of the processing target object, comparing with feature data of the registered objects stored in the storage unit 113, and calculating a degree of similarity. If a plurality of objects are stored in the storage unit 113, a degree of similarity for each object is calculated.

If the calculated degree of similarity is equal to or greater than a predetermined threshold value (first threshold value) (YES in S403), the object recognition unit 112 determines that the processing target object is the same person as the registered object stored in the storage unit 113 and sets the object into the recognition confirmed state (S404). If there are a plurality of registered objects in which the degree of similarity is equal to or greater than the predetermined threshold value and which are stored in the storage unit 113, the object recognition unit 112 determines that; the registered object in which the degree of similarity is highest is the processing target object. If the calculated degree of similarity is smaller than the predetermined threshold value (NO in S403), the object recognition unit 112 holds the recognition unconfirmed state as it is and finishes the processing for the relevant object.

If it is determined that the processing target object is in the recognition confirmed state (YES in S401) as a result of the determination in step S401, the object recognition unit 112 makes a discrimination on the basis of the determination result of the reliability by the tracking reliability determination unit 111 (S405). When the reliability of the object tracking is low (YES in S405), the object recognition unit 112 executes the recognition processing (S406). In the recognition processing which is executed here, in a manner similar to step S402, feature data of the processing target object is extracted and compared with the feature data of the registered objects stored in the storage unit 113, and the degree of similarity is calculated.

However, although the degrees of similarity are calculated with respect to all of the registered objects stored in the storage unit 113 in step S402, in step S406, the degree of similarity is calculated with respect only to the registered object in which the processing target object is set into the recognition confirmed state and which is stored in the storage unit 113. This is because of a difference of a purpose of the calculation of the degree of similarity. The processing in step S402 is a one-to-N discrimination processing regarding the recognition target object and all (N) of the registered objects and is a processing for determining which person the recognition target is. On the other hand, the processing in step S406 is a one-to-one matching processing regarding the recognition target object and the one registered object which is confirmed in the past, which is a processing for determining whether or not the recognition target object and the specific registered object are the same person. In other words, the recognition processing method differs in dependence on the recognition state. In step S402, if the registered objects are divided into several groups, the discrimination processing may be executed by using only a plurality of registered objects included in the selected group.

If the degree of similarity calculated in step S406 is smaller than a predetermined threshold value (second threshold value) (YES in S407), the object recognition unit 112 changes the processing target object from the recognition confirmed state to the recognition unconfirmed state (S408). If the calculated degree of similarity is equal to or greater than the predetermined threshold value (NO in S407), the object recognition unit 112 holds the recognition confirmed state as it is and finishes the processing to the relevant object.

If it is determined that the reliability of the object tracking is high (NO in S405) as a result of the discrimination in step S405, the object recognition unit 112 does not change the recognition state but holds the successively maintained recognition confirmed state as it is. By operating in this manner, since the recognition processing as shown in step S402 or S406 is not executed, a processing burden is reduced and a high processing efficiency is realized.

Figure 5A:
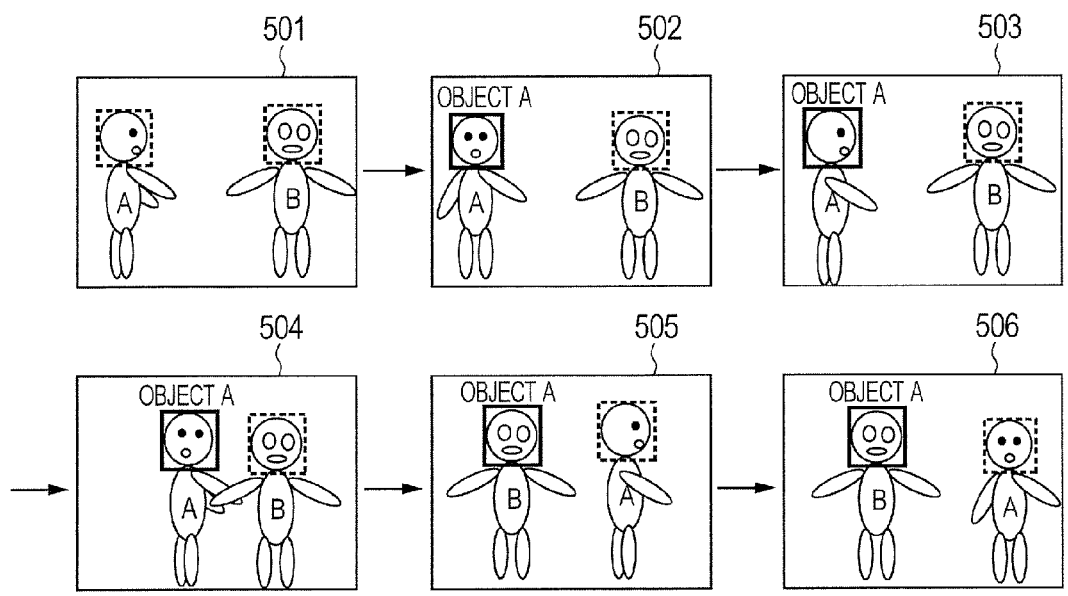
FIGS. 5A and 5B are diagrams illustrating an example of a processing result of the object recognition in the embodiment.
Figure 5B:
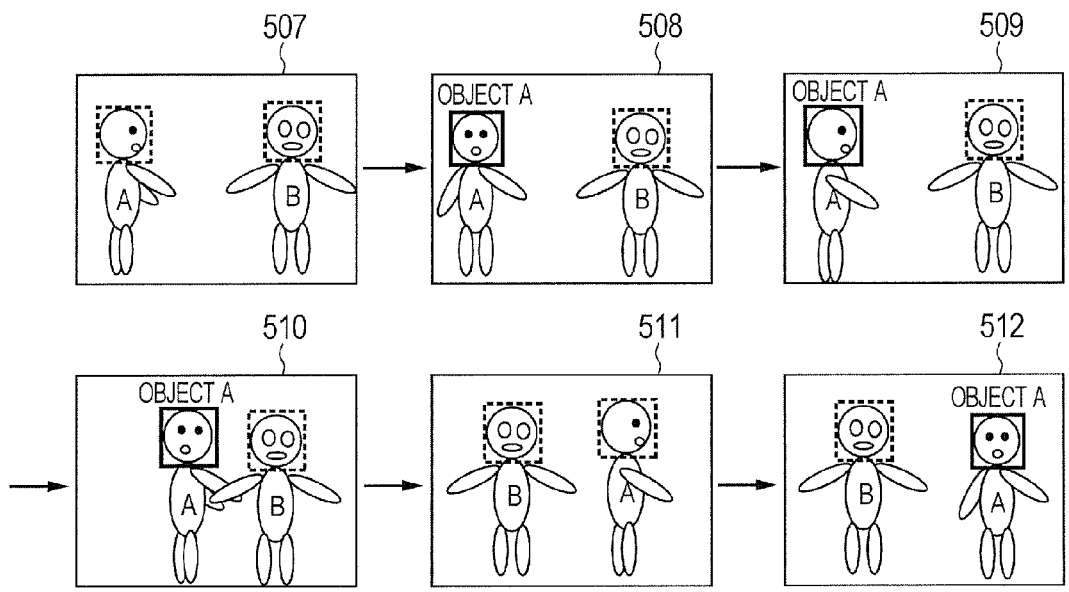

Effects of the object recognition in the present embodiment will, now be described with reference to FIGS. 5A and 5B. FIG. 5A illustrates an example of a processing result in the case where the processing for setting the processing target object into the recognition unconfirmed state is not executed when the reliability of the object tracking is low and the degree of similarity of the recognition processing is low. FIG. 5B illustrates an example of a processing result in the case where the processing for setting the processing target object into the recognition unconfirmed state is executed when reliability of the object tracking is low and the degree of similarity of the recognition processing is low. That is, the example of the processing result illustrated in FIG. 5B shows the processing result in the present embodiment.

Images 501 to 506 illustrated in FIG. 5A and images 507 to 512 illustrated in FIG. 5B are images which are sequentially supplied in time series and are schematically expressed as diagrams, respectively. A frame shown by a broken line surrounding a face in the diagram shows a recognition unconfirmed state. A frame shown by a solid line surrounding a face in the diagram shows a recognition confirmed state and a character train shown in a portion over the frame of the solid line indicates object information of the confirmed registered object.

In the diagrams, it is assumed that an object A is stored as a registered object in the storage unit 113 and an object B is not stored (it is not a registered object). Since an accuracy of the object recognition is influenced by states such as expression, orientation, and illumination condition of the face area, in a case where the state of the face area of the recognition target and the state of the face area registered in the storage unit 113 differ, there is case where the face cannot be correctly recognized. That is, in spite of a fact that the object of the recognition target and the registered object are the same person, a low degree of similarity is output. For example, a state where the face of the object A looks forward is registered in the storage unit 113 and it is assumed that in a case where the face of the recognition target looks in profile, a low degree of similarity is output irrespective of the individual person. It is also assumed that in a case where the face of the recognition target looks forward, if being the same person (if the recognition target is the object A), a high degree of similarity is output, and if being the different person (if the recognition target is the object B), a low degree of similarity is output.

In the image 501, since the face of the object A looks in profile, it cannot be correctly recognized and it is shown that the face is in the recognition unconfirmed state in the image 502, since the face of the object A looks forward, it can be correctly recognized and it is shown that the face enters the recognition confirmed state. In the image 503, although the face of the object A looks in profile, it is in the recognition confirmed state. This is because such a state is not determined on the basis of the degree of similarity by the recognition processing but since the result of the precedent frame is successively maintained by the object tracking, the recognition confirmed state is maintained. In the images 501 to 503, since the object A and the object B are away from each other and the detection state of the object area is distant, it is determined that the reliability of the object tracking is high.

In the image 504, since the object A and the object B are close and the detection state of the object area is dense, it is determined that the reliability of the object tracking is low. However, since the face of the object A looks forward and the high degree of similarity is obtained, the recognition confirmed state can be maintained. In the images 504 to 505, the object A and the object B cross each other. In the image 505, there is shown an example in which the recognition confirmed state is erroneously successively maintained to the object B due to a failure in object tracking. Since such an erroneous transfer of the recognition confirmed state is continued, a wrong recognition result is also obtained in the image 506.

Subsequently, an example of a result obtained by applying the processing in the present embodiment illustrated in FIG. 5B will be described. Since a description of the images 507 to 510 is similar to that of the images 501 to 504 mentioned above, it is omitted. In the images 510 to 511, the object A and the object B cross each other and a failure in object tracking occurs. That is, the recognition confirmed state of the object A is successively maintained to the object B. However, in the image 511, since the object A and the object B are close and the detection state of the object area is dense, it is determined that the reliability of the object tracking is low. + As for the degree of similarity calculated by the recognition processing, a low value is obtained because they are the different objects. Therefore, a processing for setting the processing target object from the recognition confirmed state to the recognition unconfirmed state is executed. Thus, in the image 511, the erroneous transfer of the recognition state is not performed. In the image 512, an example in which the face of the object locks forward, the correct recognition result is obtained, and the object is returned to the recognition confirmed state again is shown.

As mentioned above, according to the embodiment, by successively maintaining the recognition confirmed state of the processing target object by the object tracking, the recognition confirmed state can be stabilized and such a situation that the recognition confirmed state is successively maintained to the different object can be prevented.

OTHER EMBODIMENTS OF THE INVENTION

Although the embodiment of the invention has been described above, the invention is not limited to the embodiment but various modifications and changes are possible within the scope of a gist of the invention. Such examples will be described hereinbelow.

Although the foregoing embodiment has been described, as an example, with respect to the case where the image recognition apparatus for performing the object recognition is applied to the image pickup apparatus, the apparatus to which the image recognition apparatus is applied is not limited to the image pickup apparatus. For example, the image recognition apparatus for performing the object recognition may be applied to a display apparatus for displaying images (reproduction data) which are sequentially supplied from an external apparatus, recording medium, or the like. In such a display apparatus, the reproduction data is used as data for the object detection processing and the object recognition is performed. On the basis of information (a position, a size, an object ID, and the like of the object in the image) of the object which is recognized, a control unit such as a microcontroller or the like in the display apparatus controls display conditions at the time of displaying the image. Specifically speaking, the control unit controls such a superimpose display that the information showing the object such as frame, object ID, or the like is displayed at a position of the object in the image and also controls a brightness, a color tone, and the like of a display image according to luminance and chrominance information of an object portion.

The invention is also realized by executing the following processing. That is, software (program) for realizing the functions of the foregoing embodiments is supplied to a system or apparatus through a network or various kinds of storage media, and a computer (or a CPU, MPU, or the like) of the system or apparatus reads out the program and executes the processing based on the program.

Figure 6:
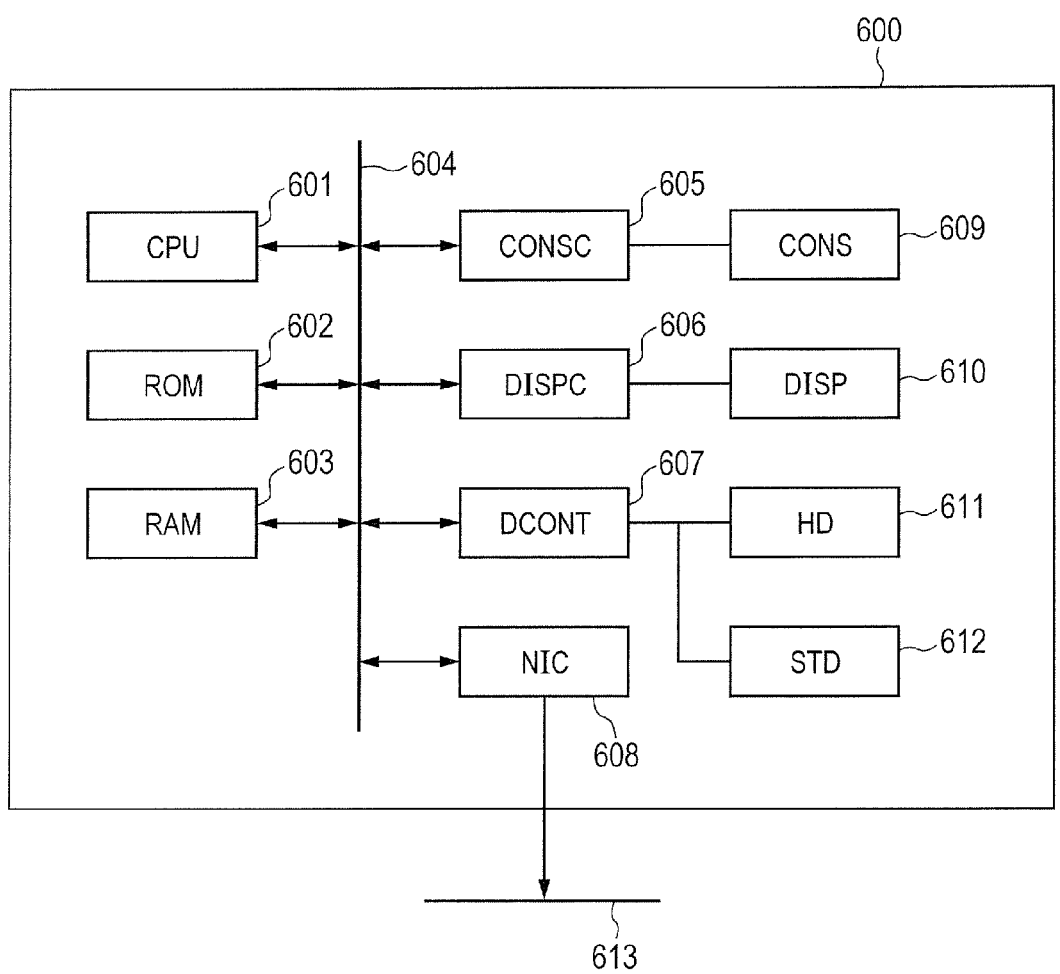
FIG. 6 is a diagram illustrating a computer function which can realize an image recognition apparatus according to the embodiment of the invention.

For example, the image recognition apparatus shown in the foregoing embodiments has a computer function 600 as illustrated in FIG. 6 and the operation in the foregoing embodiments is executed by a CPU 601.

As illustrated in FIG. 6, the computer function 600 has the CPU 601, a ROM 602, and a RAM 603. The computer function 600 also has: a controller (CONSC) 605 of an operation unit (CONS) 609; and a display controller (DISPC) 606 of a display (DISP) 610 as a display unit such as an LCD or the like. Further, the computer function 600 has: a controller (DCONT) 607 of a hard disk (HD) 611 and a storage device (STD) 612 such as a flexible disk or the like; and a network interface card (NIC) 608. Those functional units 501, 602, 603, 605, 606, 607, and 608 are connected through a system bus 604 so that they can communicate with each other.

The CPU 601 executes software stored in the ROM 602 or HD 611 or software which is supplied from the STD 612, thereby integratedly controlling each of the construction units connected to the system bus 604. That is, the CPU 601 reads out a processing program to execute the operation as mentioned above from the ROM 602, HD 511, or STD 612 and executes it, thereby making control to realize the operation in the foregoing embodiments. The RAM 603 functions as a main memory, a work area, or the like of the CPU 601.

The CONSC 605 controls an instruction input from the CONS 609. The DISPC 606 controls the display of the DISP 610. The DCONT 607 controls accesses to the HD 611 or STD 612 in which a boot program, various kinds of applications, a user file, a network management file, the processing program in the foregoing embodiments, and the like have been stored. The NIC 608 bidirectionally transmits and receives data to/from other apparatuses connected onto a network 613.

The foregoing embodiments are nothing but an example of embodiments for executing the present invention and the technical scope of the invention must not be restrictively interpreted. That is, the invention can be embodied in various forms without departing from the technical idea of the invention of a principal feature thereof.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286018, filed on Dec. 27, 2012, which is hereby incorporated by reference herein in its entirety.

What is claimed is:

1. An image recognition apparatus for recognizing a specific object from among images supplied in time series, comprising:
    a storage unit configured to store feature information regarding the specific object;
    an object detection unit configured to detect an object area from the supplied image;
    an object recognition unit configured to extract feature information from the image of the object area detected by the object detection unit, compare the extracted feature information with the feature information of the specific object stored in the storage unit, thereby calculating a degree of similarity, and perform an object recognition on the basis of the calculated degree of similarity;
    an object tracking unit configured to track the object included in the object area detected by the object detection unit, in the images supplied in time series; and
    a reliability determination unit configured to determine a reliability of the object tracking which is performed by the object tracking unit,
    wherein when the degree of similarity calculated by the object recognition unit is equal to or greater than a predetermined threshold value, the object included in the object area is determined as being the specific object stored in the storage unit so that a recognition confirmed state is set, and the recognition confirmed state is successively maintained between the images supplied in time series by means of the object tracking by the object tracking unit, and
    when the reliability of the object tracking is low and the degree of similarity calculated by the object recognition unit is smaller than the predetermined threshold value, the recognition confirmed state which is successively maintained is set into a recognition unconfirmed state where the object included in the object area is not determined a being the specific object.

2. An apparatus according to claim 1, wherein when the reliability of the object tracking is high, the object recognition unit does not execute the object recognition for the object in which the recognition confirmed state is successively maintained by the object tracking.

3. An apparatus according to claim 1, wherein when the plurality of object areas detected by the object detection unit are densely distributed, the reliability determination unit determines that the reliability of the object tracking is low, and when the plurality of object areas detected by the object detection unit are distantly distributed, the reliability determination unit determines that the reliability of the object tracking is high.

4. An apparatus according to claim 1, wherein:
    for the object in which the recognition confirmed state is not successively maintained by the object tracking, the object recognition unit calculates a degree of similarity to each of the plurality of objects stored in the storage unit; and
    for the object in which the recognition confirmed state is successively maintained by the object tracking, the object recognition unit calculates a degree of similarity to the object set into the recognition confirmed state among the objects stored in the storage unit.

5. An image pickup apparatus comprising:
    an image pickup unit configured to supply picked-up images in time series;
    the image recognition apparatus according to claim 1; and
    a control unit configured to control an image pickup condition in the image pickup unit in accordance with information of the object which is obtained by the image recognition apparatus.

6. A display apparatus comprising:
    a display unit configured to display images supplied in time series;
    the image recognition apparatus according to claim 1; and
    a control unit configured to control a display condition of the image in the display unit in accordance with information of the object which is obtained by the image recognition apparatus.

7. A control method of an image recognition apparatus for recognizing a specific object, feature information of which is stored in a storage unit, from among images supplied in time series, comprising:
    an object detection step of detecting an object area from the supplied image;
    an object recognition step of extracting feature information from the image of the object area detected in the object detection step, comparing the extracted feature information with the feature information of the specific object stored in the storage unit, thereby calculating a degree of similarity, and performing an object recognition on the basis of the calculated degree of similarity;
    an object tracking step of tracking the object included in the object area detected in the object detection step in the images supplied in time series; and
    a reliability determination step of determining a reliability of the object tracking which is performed in the object tracking step,
    wherein when the degree of similarity calculated in the object recognition step is equal to or greater than a predetermined threshold value, the object included in the object area is determined as being the specific object stored in the storage unit so that a recognition confirmed state is set, and recognition confirmed state is successively maintained between the images supplied in time series by means of the object tracking in the object tracking step, and
    when the reliability of the object tracking is low and the degree of similarity calculated in the object recognition step is smaller than the predetermined threshold value, the recognition confirmed state which is successively maintained is set into a recognition unconfirmed state where the object included in the object area is not determined as being the specific object.

8. A non-transitory computer-readable storage medium storing a program for causing a computer to execute a control method of an image recognition apparatus for recognizing a specific object, feature information of which is stored in a storage unit, from among images supplied in time series,
    the control method comprising:
    an object detection step of detecting an object area from the supplied image;
    an object recognition step of extracting feature information from the image of the object area detected in the object detection step, comparing the extracted feature information with the feature information of the specific object stored in the storage unit, thereby calculating a degree of similarity, and performing an object recognition on the basis of the calculated degree of similarity;

an object tracking step of tracking the object included in the object area detected in the object detection step in the images supplied in time series; and a reliability determination step of determining a reliability of the object tracking which is performed in the object tracking step, wherein when the degree of similarity calculated in the object recognition step is equal to or greater than a predetermined threshold value, the object included in the object area is determined as being the specific object stored in the storage unit so that a recognition confirmed state is set, and the recognition confirmed state is successively maintained between the images supplied in time series by means of the object tracking in the object tracking step, and when the reliability of the object tracking is low and the degree of similarity calculated in the object recognition step is smaller than the predetermined threshold value, the recognition confirmed state which is successively maintained is set into a recognition unconfirmed state where the object included in the object area is not determined as being the specific object.

\* \* \* \* \*